Figure 1:
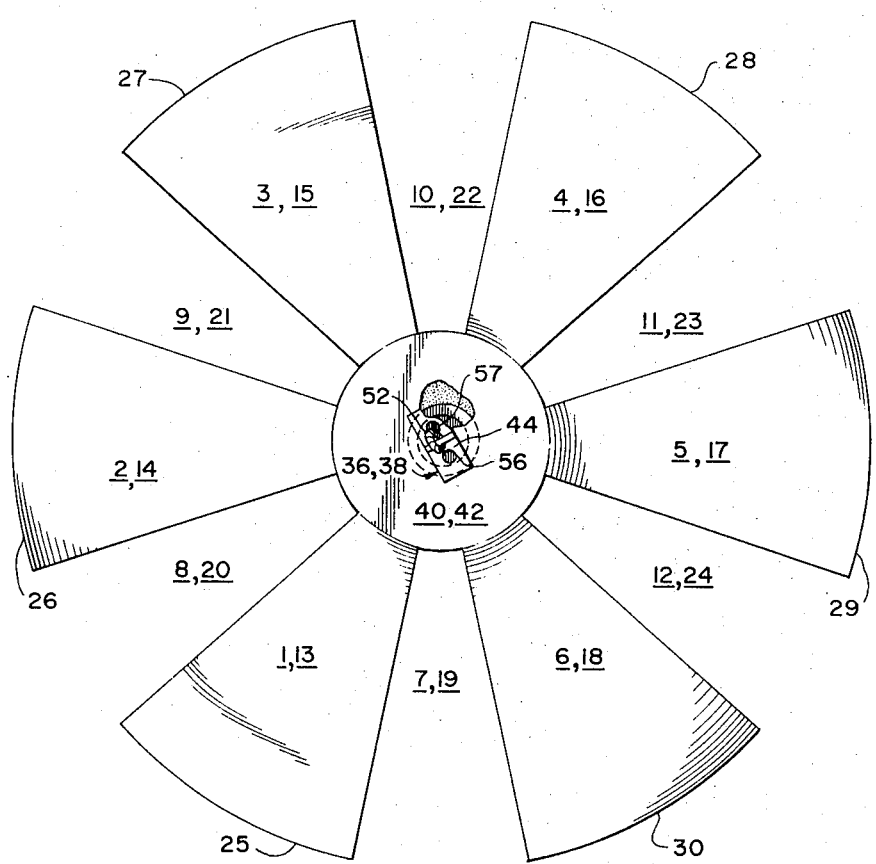

United States Patent

Weatherston et al.

[11] 3,863,384
[45] Feb. 4, 1975

[54] INSECT TRAP

[75] Inventors: John Weatherston; James H. Moffatt, both of Sault Ste. Marie, Ontario, Canada

[73] Assignee: Canadian Patents and Development Limited, Ottawa, Ontario, Canada

[22] Filed: Feb. 1, 1974

[21] Appl. No.: 438,731

[30] Foreign Application Priority Data
Mar. 29, 1973 Canada.............................. 167492

[52] U.S. Cl. .............................................. 43/114
[51] Int. Cl............................................. A01m 1/14
[58] Field of Search .............. 43/114, 107, 115, 131

[56] References Cited
UNITED STATES PATENTS
1,112,064   9/1914   Gordon.................................. 43/114
3,755,958   9/1973   Bradshaw.............................. 43/114
FOREIGN PATENTS OR APPLICATIONS
222,012   5/1910   Germany.............................. 43/114

*Primary Examiner*—Warner H. Camp
*Attorney, Agent, or Firm*—Francis W. Lemon

[57] ABSTRACT

An insect trap of flexible sheet material comprising a plurality of radially extending upper panels with their inner ends joined and with insect entrance slots between them, radially extending lower panels with their inner ends joined and with insect entrance slots between them, and their outer ends joined to the end of an overlying upper panel, and a sticky, insect trapping coating on the facing surfaces of the upper and lower panel, and an insect luring odor emitting substance in between the upper and lower panels. Loops are provided on either side of the trap so that the upper and lower panels may be pulled to space them and hung on a tree. Insects entering the trap instinctively land on the lower inside surface and become trapped, and so the useful life of the trap is extended by hanging it upside down to further trap insects on the other inside surface.

3 Claims, 2 Drawing Figures

INSECT TRAP

This invention relates to insect traps.

The trapping of insects has long been practised as a method for controlling insect species that are injurious to, for example, trees, plants and shrubs. Although known insect traps are seldom of much value for the direct control of flying insect population outdoors, an effective flying insect trap at least could be extremely useful as an indicator or monitor of the presence of a population of flying insects and that the need to undertake some effective control action is necessary. With the increase in knowledge of the behaviour of flying insects, and the factors that influence the behaviour of flying insects, leading to better understanding of the best methods of controlling these flying insects, it is apparent that there will be an increasing demand for an effective trap for these flying insects as usage of them becomes greater and the research involving their use becomes more diverse.

It is one object of the present invention to provide an insect trap which is more effective in trapping insects than known insect traps and which, in some instances, may be effective enough to provide a useful measure of control of the insect population.

Known types of traps for flying insects, which are used in conjunction with an insect attractant, to monitor or control insect populations do not incorporate all of the necessary features of good trapping efficiency, ease of handling, durability and economy in low cost of manufacture. To elaborate on some of these features:

i. High Trapping Efficiency

To achieve this it is necessary to combine an optimum trapping area together with several entrance ports, maximum possible use of area which can be used for trapping flying insects, and possible macimum use of any colour which may enhance the attraction of the insect trap to the praticular flying insect to be trapped.

ii. Ease of Handling

To achieve this the insect trap should facilitate packaging, storage, transportation to the sites of use in compactness and susceptibility to damage, and ease of assembly and setting for use.

iii. Durability

The insect trap to achieve this should be capable of withstanding adverse weather conditions, such as rain, and airborne and falling debris, and remain capable of performing as an effective insect trap.

It is a further object of the present invention to provide an insect trap which has a good insect trapping efficiency, is easy to handle, is durable and is economical to produce.

Insect traps which are commerically available at the present time do not satisfy all of the above features, for example, they may have a large trapping surface but have only one or two insect entrances and may be bulky so that the user can carry only four or five traps at a time.

According to the present invention there is provided an insect trap comprising:

a. a plurality of upper panels of flexible sheet material joined at their inner ends and extending radially outwardly with insect entrance slots between them, with the upper panels spaced circumferentially around the join, b. a plurality of lower panels of flexible sheet material joined at their inner ends and extending radially, with insect entrance slots betwen them, to positions at which each lower panel is joined adjacent an outer end to an overlying upper panel, c. an insect trapping sticky coating on facing surfaces of the upper and lower panels, d. an insect luring odour emitting substance between the upper and lower panels, e. means for suspending the trap with the upper panels uppermost, f. means for suspending the trap with the lower panels uppermost, and whereby g. the trap may be stored in a flat condition with the facing surfaces of the upper and lower panel contacting one another, and the upper and lower panels may be pulled to space their facing surfaces for use.

Figure 2:
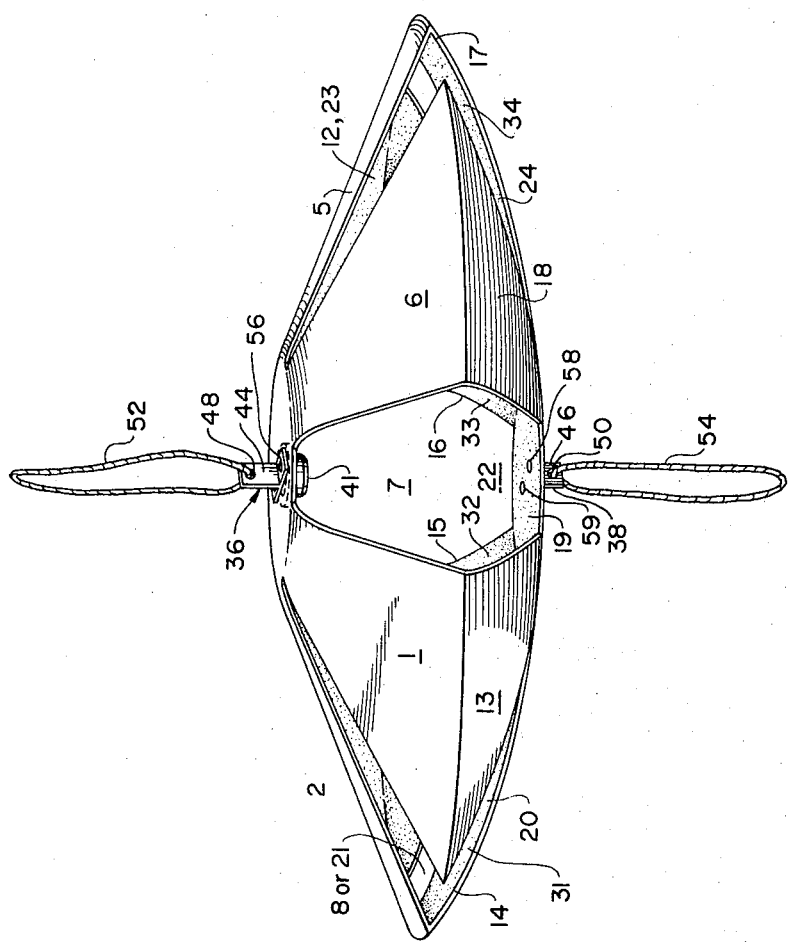

In the accompanying drawings which illustrate by way of example, an embodiment of the present invention:

FIG. 1 is a view of either side, both of which are identical, of an insect trap in a flat condition for storage with the upper and lower panel facing surfaces contacting one another, and FIG. 2 is a side view, viewed slightly from above, of the insect trap shown in FIG. 1, with the upper and lower panels pulled to space their facing surfaces for use.

In FIGS. 1 and 2 there is shown an insect trap comprising:

a. a plurality of upper panels 1 to 6 of flexible sheet material joined at their inner ends and extending radially outwardly with insect entrance slots 7 to 12 between them and with the upper panels 1 to 6 spaced around the join, b. a plurality of lower panels 13 to 18 joined at their inner ends extending radially, with insect entrance slots 19 to 24 between them, to positions 25 to 30 (FIG. 1) at which each lower panel 13 to 18 is joined adjacent an outer end to an overlying upper panel 1 to 6 respectively, c. an insect trapping stickly coating, shown only designated 31 to 34 for lower panels 14 to 17 respectively, on facing surfaces of the upper panels 1 to 6 and lower panels 13 to 18, d. an insect luring odour emitting substnace, between the upper panels 1 to 6 and lower panels 13 to 18, which a sex lure for moths and in a liquid form may be in a small dispenser, for example of plastic vial, which is suspended in the trap or placed centrally on the upper sticky coatings (not shown) or when a feeding stimulant may be conveniently included in the insect trapping sticky coating, e. means, generally designated 36, for suspending the trap with the upper panels 1 to 6 uppermost, f. means, generally designated 38 for suspending the trap with the lower panels 13 to 18 uppermost, and whereby g. the trap may be stored in a flat condition, as shown in FIG. 1, with the facing surfaces of the upper panels 1 to 6 and the lower panels 13 to 18 contacting one another, and, as shown in FIG. 2, the upper panels 1 to 6 and lower panels 13 to 18 may be pulled to space their facing surfaces for use.

In this embodiment the upper panels 1 to 6 are joined at their inner ends by an upper central portion 40 of flexible sheet material which is integral with them. Similarly the lower panels 13 to 18 are joined at their inner ends by a lower central portion 42 of flexible sheet material which is integral with them.

As an example of the embodiment shown in FIGS. 1 and 2, the upper panels 1 to 6 and upper central portion 40 where cut from a 14 inch diameter disc of a plasticized paper and the insect entrance slots 7 to 12 were cut from the disc to have an inner, minimum width of three/fourth inch and an outer, maximum width of 2½ inches. The radius of the central portion, that is the radius from the trap center to the inner ends of the slots 7 to 12 was 2 inches. The lower panels 13 to 18 and lower central portion 42 were formed in the same manner, and dimensions and from the same sheet material as the upper panels 1 to 6 and upper central portion 40. In fact, for economy of manufacture a number of blanks are preferably cut simultaneously from a stack of sheets of plasticized paper to form a plurality of upper panels 1 to 6 with their upper central portion 40, and a plurality of lower panels 13 to 18 with their lower central portions 42.

The whole of the surfaces to face or oppose one another of the upper panels 1 to 6, except for a marginal outer edge portion, and upper central portion 40, and lower palens 13 to 18 and central portion 42 are each then coated with the insect trapping sticky coating. When the odour emitting substance simulates the sex attracting odour emitted by the female Spruce Budworm, which may be Stickum or Tanglefoot (both registered trade marks) obtainable from Michel and Pelton Co., Emeryville Califl, U.S.A. and the Tanglefoot Co. Grand Rapids, Mich. U.S.A., the substance may be in vial 41, FIG. 2, adhering to the upper sticky coating. The marginal outer edge portions of the upper panels 1 to 6 and lower panels 13 to 19 are then joined by crimping or heat sealing them together. The vial 41 is removed when the trap is inverted and a fresh one similarly placed on the new upper sticky coating.

The means 36 and 38, for suspending the trap each comprise an inverted T-shaped, tab 44 and 46 respectively formed from an adhesive coated plastic tape, each provided with a hole 48 and 50 respectively in the upstanding arm of the T, and a closed wire loop 52 an 54 respectively. The flanges of the T-shaped tabs 44 and 46 are secured by the adhesive coating of the tape to the upper central portion 40 and lower central portion 42 respectively. Drainage holes 56, 57, 58 and 59 to drain rain water from the trap interior, are then punched completely through the assembly through the 'T' shaped tabs 44 and 46 respectively, in one operation by ensuring that the T-shaped tabs 44 and 46 were initially placed immediately opposite one another on the upper central portion 40 and lower central portion 42 respectively.

In operation the trap is stored, packaged and transported in the flat condition shown in FIG. 1. A person using the trap can easily carry quite a number of them to the area where they are to be installed.

For use, all that is necessary is for the T-shaped tabs 44 and 46 to be pulled to space the upper panels as shown in FIG. 2, insert the vial 41 and then suspend the trap from a tree by the wire loop 52.

If the trap interior has a Spruce Budworm sex attracting odour emitting substance, for attracting male Spruce Budworm, then the male Spruce Budworm are attracted into the trap and, by instinct, land on the lower inside surface of the trap and adhere to the sticky coating. When the lower inside surface of the trap has collected as many male Spruce Budworm as is practical, the useful life of the trap is extended by removing the vial 41, inverting the trap, inserting a fresh vial 41 on the upper stick coating, and suspendiing the trap by the wire loop 54, so that male Spruce Budworm entering the trap now instinctively land on the opposite side of the trap interior, which now constitutes the floor, and adhere to that surface.

The use of the insect trap is not limited to trapping Spruce Budworm, it may be used for trapping other flying insects. The trap has shown to be better than any known insect traps for trapping apple maggots, with the sticky coating containing an apple maggot feeding stimulant and the trap exterior coloured "Dayglo Yellow" (registered trade mark).

The shape of the trap has been found to protect the interior thereof very well from falling debris from trees and from rain. If desired, the portection from rain may, in some instances, be improved by providing small flaps, on the panels and center portions, which may be folded outwardly when the trap is opened to retard rain from being driven by wind from the trap exterior into the insect entrance slots.

The insect entrance slots need not taper in width to increase in width outwardly from the trap center but may, if desired have parallel or curved sides.

The upper and lower panels need not be joined along the whole lenghts,

Three traps according to the present invention, which were ten inches in overall diameter when flat, showed the following trapping efficiencies for Spruce Budworm:

| Insects Trapped | Sex Lure Charge |
| --- | --- |
| 57 | 10 m.g. |
| 85 | 5 m.g. |
| 39 | 1 m.g. |

Traps according to the present invention have been found to have high trapping efficiency, to be easy to handle, durable and economical to manufacture.

We claim:
1. An insect trap comprising:
   a. a plurality of upper panels of flexible sheet material joined at their inner ends and extending radially outwardly with insect entrances slots between them, with the upper panels spaced circumferentially around the join,
   b. a plurality of lower panels of flexible sheet material joined at their inner ends and circumferentially spaced around the join and extending radially outwardly, with insect entrance slots between them, to positions at which each lower panel is joined adjacent an outer end to an overlying upper panel,
   c. an insect trapping sticky coating on opposed, facing surfaces of the upper and lower panels,
   d. an insect luring odour emitting substance between the upper and lower panels,
   e. means for suspending the trap with the upper panels uppermost,
   f. means for suspending the trap with the lower panels uppermost, and whereby
   g. the trap may be stored in a flat condition with the facing surface of the upper and lower panel contacting one another, and the upper and lower pan- els may be pulled to space their facing surfaces for use.

2. An insect trap according to claim 1, wherein the upper panels are joined at their inner ends by an upper central portion of flexible sheet material which is integral with the upper panels, and the lower panels are joined at their inner ends by a lower central portion of flexible sheet material which is integral with the panels.

3. An insect trap according to claim 1, wherein both of the means for suspending the trap comprise T-shaped tabs of adhesive coated plastic tapes each secured by the adhesive coating on the flange to their respective sides of the trap, and closed wire loops each passing through the upstanding arm of the 'T' of the T-shaped the tab.

* * * * *